United States Patent
Hwang

(10) Patent No.: US 6,452,973 B1
(45) Date of Patent: Sep. 17, 2002

(54) SYSTEM AND METHOD FOR CONVERTING H.261 COMPRESSED MOVING PICTURE DATA TO MPEG-1 COMPRESSED MOVING PICTURE DATA ON COMPRESSION DOMAIN

(75) Inventor: Dae-Hwan Hwang, Taejon (KR)

(73) Assignees: Electronics and Telecommunications Research Institute, Taejon (KR); Korea Telecom, Sungnam-shi (KR)

( * ) Notice: Subject to any disclaimer, the term of this patent is extended or adjusted under 35 U.S.C. 154(b) by 0 days.

(21) Appl. No.: 09/432,400

(22) Filed: Nov. 2, 1999

(30) Foreign Application Priority Data

Nov. 25, 1998 (KR) .............................................. 98-50761

(51) Int. Cl.[7] .............................................. H04N 11/02
(52) U.S. Cl. .................... 375/240.27; 348/441; 382/235
(58) Field of Search .................... 348/441; 375/240.27; 382/235

(56) References Cited

U.S. PATENT DOCUMENTS

| | | | | |
|---|---|---|---|---|
| 5,408,274 A | | 4/1995 | Chang et al. ............... | 348/700 |
| 5,537,440 A | * | 7/1996 | Eyuboglu ................... | 375/245 |
| 5,657,015 A | * | 8/1997 | Nakajima .................... | 341/61 |
| 5,708,732 A | | 1/1998 | Merhav et al. ............. | 382/232 |
| 6,058,122 A | * | 5/2000 | Hwang ........................ | 370/522 |

OTHER PUBLICATIONS

"MC.DCT Compressed Video" by Chang and Messerschmitt, IEEE Journal on Selected Areas in Communications, vol. 13, No. 1, Jan. 1995, pp. 3–11.

"Transcoding GIF Images to JPEG–LS" by N. Memon and R. Rodila, IEEE Transactions on Consumer Electronics, vol. 43, No. 3, Aug. 1997, pp. 424–429.

"Manipulation and Compositing of MC–DCT Compressed Video" by Shih–Fu Chang, IEEE Journal on Selected Areas in Communications, vol. 13, No. 1, Jan. 1995, pp. 474–476.

"An Efficient JPEG to MPEG–1 Transcoding Algorithm" by Ja–Ling Wu et al., IEEE Transactions on Consumer Electronics, vol. 42, No. 3, Aug. 1996, pp. 447–457.

"Fast Algorithms for DCT–Domain Image Down–Sampling and for Inverse Motion Compensation" by Neri Merhav et al., IEEE Transactions on Circuits and Systems for Video Technology, vol. 7, No. 3, Jun. 1997, pp. 468–475.

* cited by examiner

*Primary Examiner*—Chris Kelley
*Assistant Examiner*—Charles Parsons
(74) *Attorney, Agent, or Firm*—Antonelli, Terry, Stout & Kraus, LLP

(57) ABSTRACT

A system for converting a heterogeneous compressed moving picture data, includes: a variable length decoder for generating variable length decoded data as first compressed moving picture data from a first data bit stream; a compressed moving picture data analyzer for analyzing layer types of the first compressed moving picture data; a layer-matching device for matching layers of the first compressed moving picture data to layers of second compressed moving picture data, thereby generating the second compressed moving picture data; and a variable length encoder for generating variable length coded data as a second data bit stream. Thereby, the system can convert an H.261 compressed moving picture data to an MPEG-1 compressed moving picture data on a compression domain.

24 Claims, 8 Drawing Sheets

FIG. 7

| | H.261 | MPEG-1 |
|---|---|---|
| RESOLUTION | CIF, QCIF | SIF |
| (8*8)DCT | AVAILABLE | AVAILABLE |
| ZIGZAG SCAN | AVAILABLE | AVAILABLE |
| QUANTIZATION TABLE | NOT AVAILABLE | AVAILABLE |
| NOTION COMPENSATION | FORWARD DIRECTION | UNIDIRECTION or BIDIRECTION |
| NOTION VECTOR | FULL PIXEL | HALF PIXEL |
| PLANARIZTION | LOOP FILTER | HALF-PIXEL MOTION COMPENSATION |
| BUFFER CONTROL | AVAILABLE | AVAILABLE |
| VLC TCOEFF | FIXED VALUE | DIFFERENTIAL VALUE OF INTRA DC |
| VLC MBA, CBP | FIXED VALUE | SIMILAR TO H.261 |
| VLC MV, MTYPE | FIXED | EXTENSIBLE |

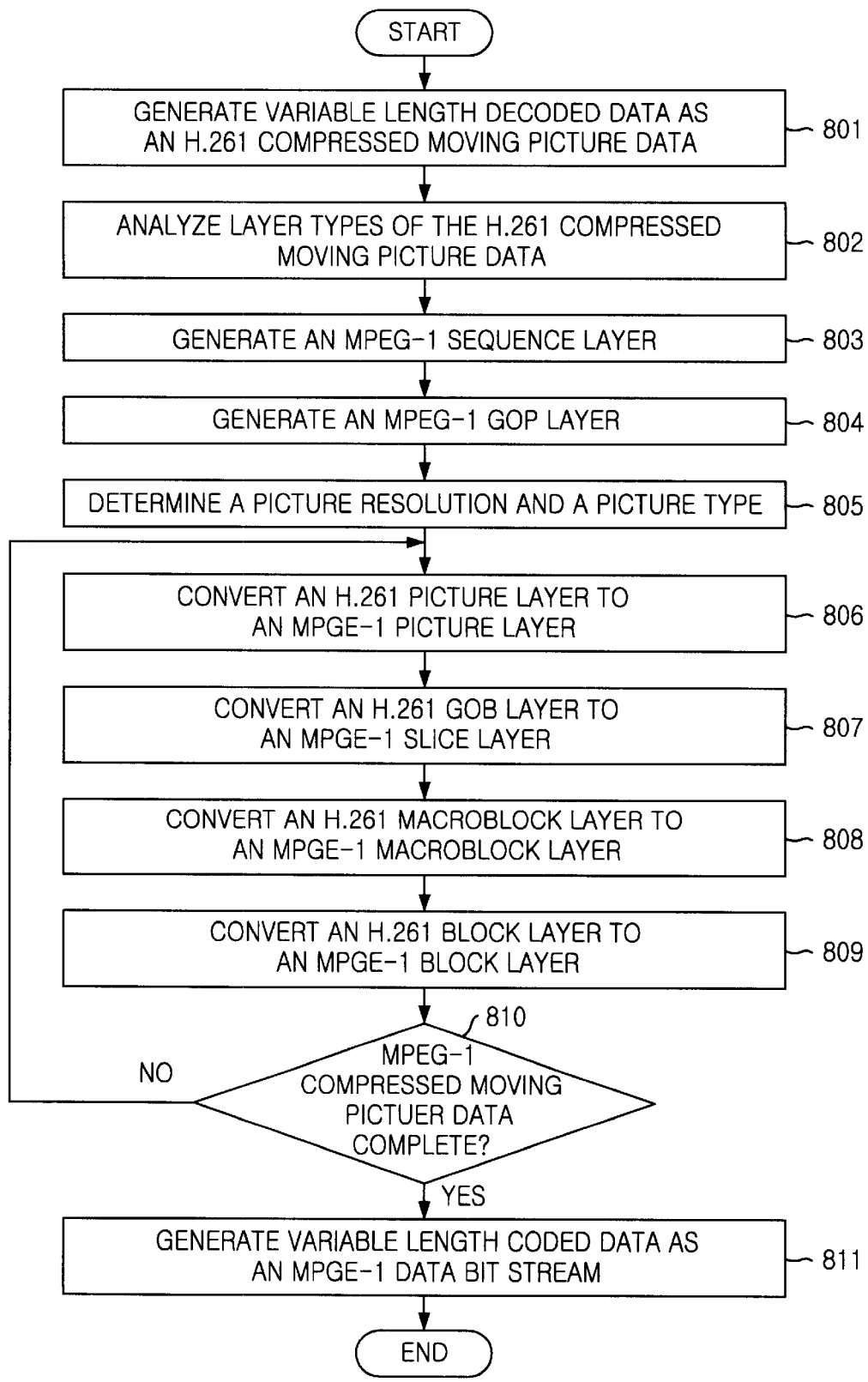

SYSTEM AND METHOD FOR CONVERTING H.261 COMPRESSED MOVING PICTURE DATA TO MPEG-1 COMPRESSED MOVING PICTURE DATA ON COMPRESSION DOMAIN

FIELD OF THE INVENTION

The present invention relates to a system and method for converting heterogeneous compressed moving picture data and, more particularly, to a system and method for converting H.261 compressed moving picture data to moving picture expert group-1 (MPEG-1) compressed moving picture data on a compression domain.

DESCRIPTION OF THE PRIOR ART

Recently, an information communication technique has been developed to a stage capable of providing various multimedia communication services together with the realization of a superhighway information communication network. A principal technique, required for these services, is that a service system compresses moving picture data without losing the moving picture data and transmits the compressed moving picture data via a limited frequency band.

Further, a moving picture compression technique has been developed and standardized to various types. The various types include H.261 and H.263 standardized by telecommunication standardization sector of international telecommunication union (ITU-T), and moving picture expert group-1 (MPEG-1) and moving picture expert group-2 (MPEG-2) standardized by international organization for standardization/international electrotechnical commission (ISO/IEC). The moving picture compression standard has an effect on multimedia communication terminal standard such as H.310, H.320, H.321, H.322, H.323, H.324 and so on.

When origination and destination communication terminals employ media compression standard different from each other, the origination communication terminal should convert the media compression standard of the origination communication terminal to that of the destination communication terminal. Accordingly, a heterogeneous media format should be supported to multimedia communication terminals based on standard different from each other so that the interface between the multimedia communication terminals is efficiently accomplished.

Referring to FIG. 1, there is shown a conventional system for converting an H.261 data bit stream to an MPEG-1 data bit stream on a pixel domain. The conventional system includes an H.261 moving picture decoding apparatus 11 and an MPEG-1 moving picture encoding apparatus 12.

The H.261 moving picture decoding apparatus 11 decodes the H.261 data bit stream to obtain decoded digital signals on the pixel domain. The H.261 moving picture decoding apparatus 11 includes a variable length decoder 111, an inverse quantizer 112, an inverse discrete cosine transform (DCT) processor 113 and a motion compensator 114.

The MPEG-1 moving picture encoding apparatus 12 encodes the decoded H.261 data bit stream into the MPEG-1 data bit stream. The MPEG-1 moving picture encoding apparatus 12 includes a motion estimator 121, a DCT processor 122, a quantizer 123 and a variable length encoder 124.

Since the conventional system needs the H.261 moving picture decoding apparatus 11 and the MPEG-1 moving picture encoding apparatus 12, there is a problem that a system structure and processing is complicated.

Further, an H.261 data bit stream is converted to an MPEG-1 data bit stream on a pixel domain, not a compression domain, so that the quality of a moving picture is degraded and the system processing speed is delayed.

Accordingly, the conventional system may not be employed in an interactive multimedia communication such as a video phone and a video conference because of the complicated system structure, the quality degradation of the moving picture and the delayed system processing speed.

SUMMARY OF THE INVENTION

It is, therefore, an object of the present invention to provide a system for converting H.261 compressed moving picture data to moving picture expert group-1 (MPEG-1) compressed moving picture data on a compression domain.

It is another object of the present invention to provide a method for converting H.261 compressed moving picture data to moving picture expert group-1 (MPEG-1) compressed moving picture data on a compression domain.

It is further another object of the present invention to provide a computer-readable medium that performs a method for converting H.261 compressed moving picture data to moving picture expert group-1 (MPEG-1) compressed moving picture data on a compression domain.

In accordance with an aspect of the present invention, there is provided a system for converting a heterogeneous compressed moving picture data, comprising: a variable length decoder for generating variable length decoded data as first compressed moving picture data from a first data bit stream; a compressed moving picture data analyzer for analyzing layer types of the first compressed moving picture data; a layer-matching device for matching layers of the first compressed moving picture data to layers of second compressed moving picture data, thereby generating the second compressed moving picture data; and a variable length encoder for generating variable length coded data as a second data bit stream.

In accordance with another aspect of the present invention, there is provided a method for converting a heterogeneous compressed moving picture, comprising the steps of: a) generating variable length decoded data as first compressed moving picture data from a first data bit stream; b) analyzing layer types of the first compressed moving picture data; c) matching layers of the first compressed moving picture data to layers of second compressed moving picture data, thereby generating the second compressed moving picture data; and d) generating variable length coded data as a second data bit stream.

In accordance with further another aspect of the present invention, there is provided a computer-readable medium for performing the steps of: a) generating variable length decoded data as first compressed moving picture data from a first data bit stream; b) analyzing layer types of the first compressed moving picture data; c) matching layers of the first compressed moving picture data to layers of second compressed moving picture data, thereby generating the second compressed moving picture data; and d) generating variable length coded data as a second data bit stream.

BRIEF DESCRIPTION OF THE DRAWINGS

The above and other objects and features of the instant invention will become apparent from the following description of preferred embodiments taken in conjunction with the accompanying drawings, in which:

FIG. 7 shows a table illustrating the difference between H.261 compressed moving picture data and MPEG-1 compressed moving picture data; and FIG. 8 is a flow chart illustrating a method for converting an H.261 data bit stream to an MPEG-1 data bit stream in accordance with the present invention.

DETAILED DESCRIPTION OF THE INVENTION

Figure 1:
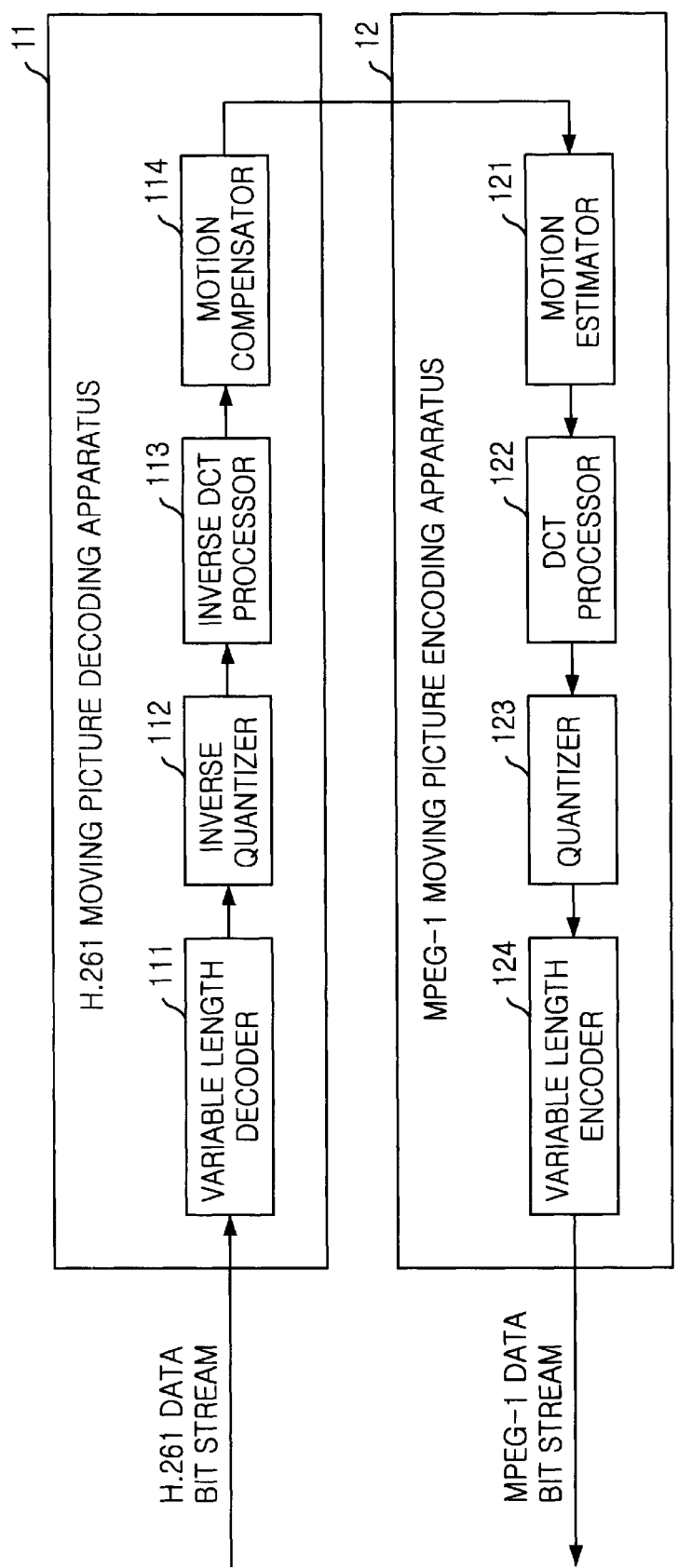
FIG. 1 is a block diagram showing a conventional system for converting an H.261 data bit stream to an MPEG-1 data bit stream.
Figure 2:
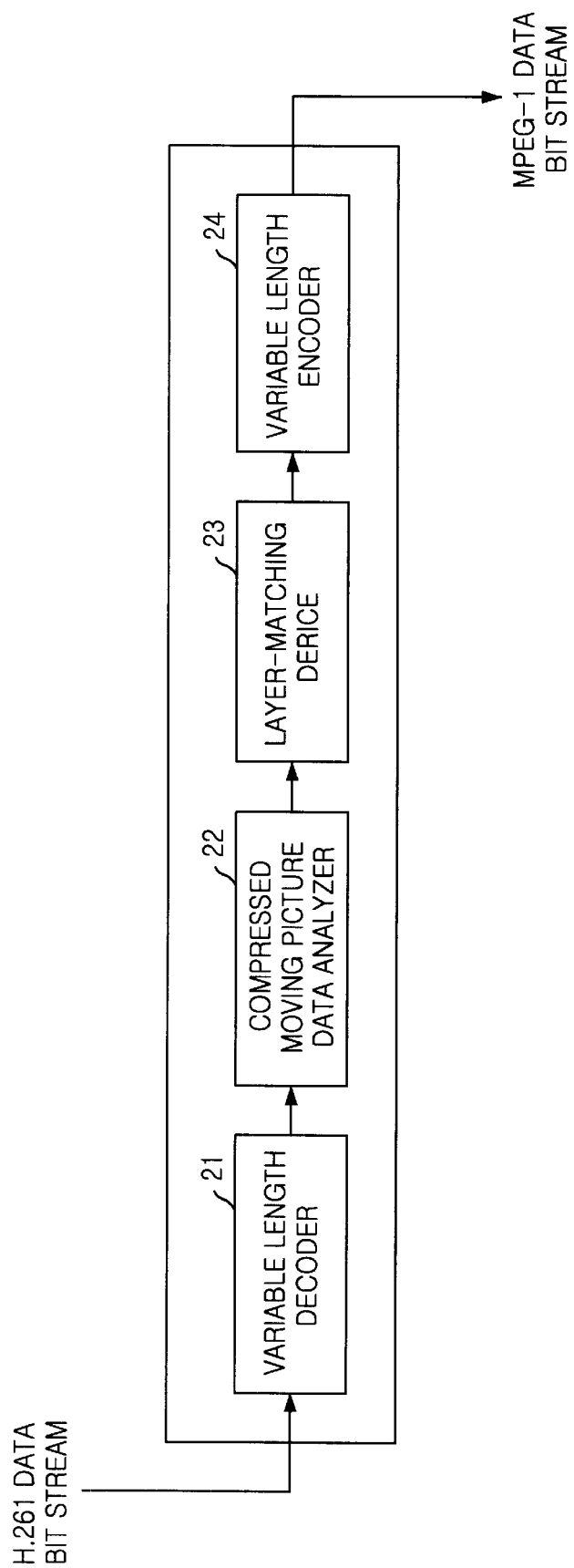
FIG. 2 is a block diagram describing a system for converting an H.261 data bit stream to an MPEG-1 data bit stream in accordance with the present invention.

Referring to FIG. 2, a system for converting an H.261 data bit stream to an MPEG-1 data bit stream includes a variable length decoder 21, a compressed moving picture data analyzer 22, a layer-matching device 23 and a variable length encoder 24.

The variable length decoder 21 generates variable length decoded data as H.261 compressed moving picture data from the H.261 data bit stream.

The compressed moving picture data analyzer 22 analyzes layer types of the H.261 compressed moving picture data.

The layer-matching device 23 matches layers of the H.261 compressed moving picture data to those of the MPEG-1 compressed moving picture data, thereby generating the MPEG-1 compressed moving picture data.

The variable length encoder 24 generates variable length coded data as the MPEG-1 bit stream from the MPEG-1 compressed moving picture data.

Figure 3:
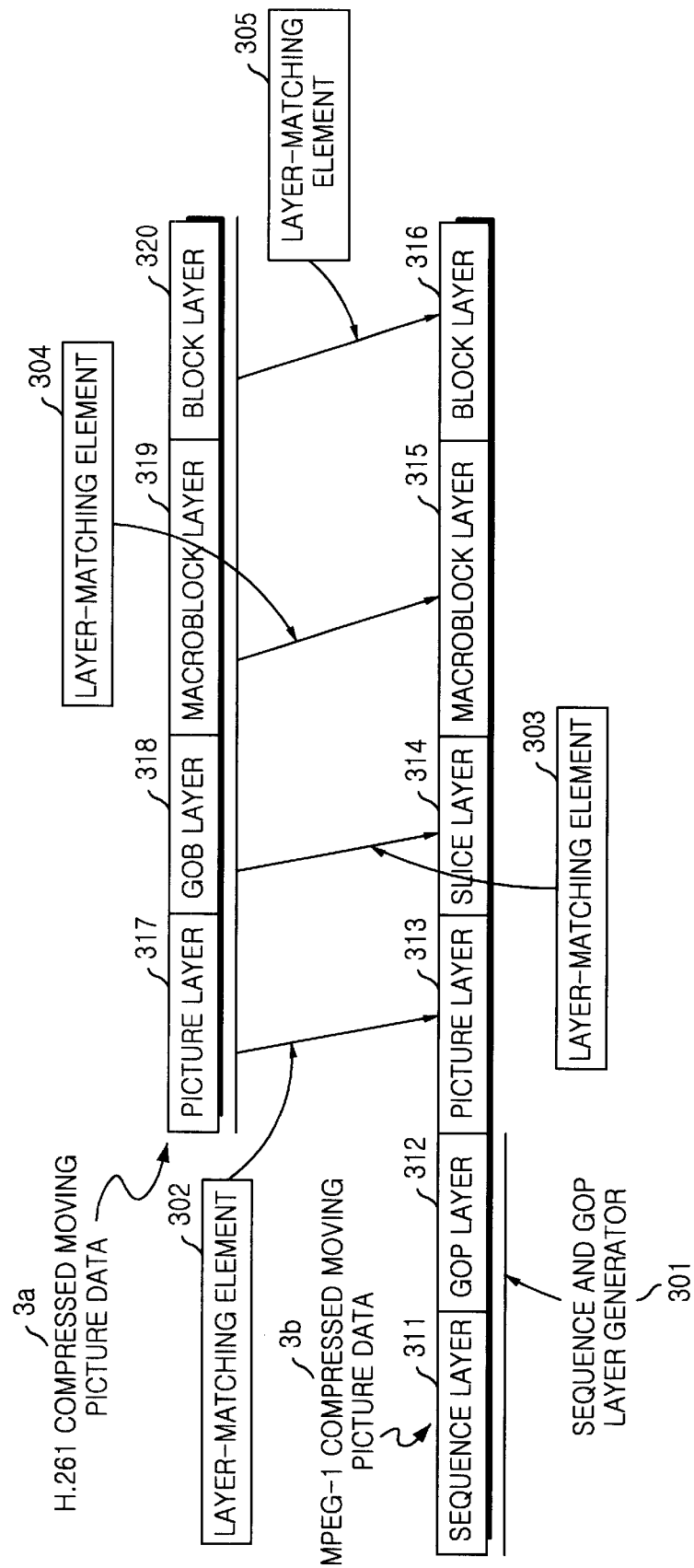
FIG. 3 is an explanatory diagram depicting layers of H.261 and MPEG-1 compressed moving picture data and a layer-matching device shown in FIG. 2.

Referring to FIG. 3, H.261 compressed moving picture data 3a includes a picture layer 317, a group of blocks (GOB) layer 318, a macroblock layer 319 and a block layer 320. On the other hand, MPEG-1 compressed moving picture data 3b includes a sequence layer 311, a group of pictures (GOP) layer 312, a picture layer 313, a slice layer 314, a macroblock layer 315 and a block layer 316.

A sequence and GOP layer generator 301 of the layer-matching device 23 shown in FIG. 2 generates the sequence layer 311 and the GOP layer 312. A layer-matching element 302 converts the H.261 picture layer 317 to the MPEG-1 picture layer. A layer-matching element 303 converts the H.261 GOB layer 318 to the MPEG-1 slice layer 314. A layer-matching element 304 converts the H.261 macroblock layer 319 to the MPEG-1 macroblock layer 315. A layer-matching element 305 converts the H.261 block layer 320 to the MPEG-1 block layer 316.

Figure 4:
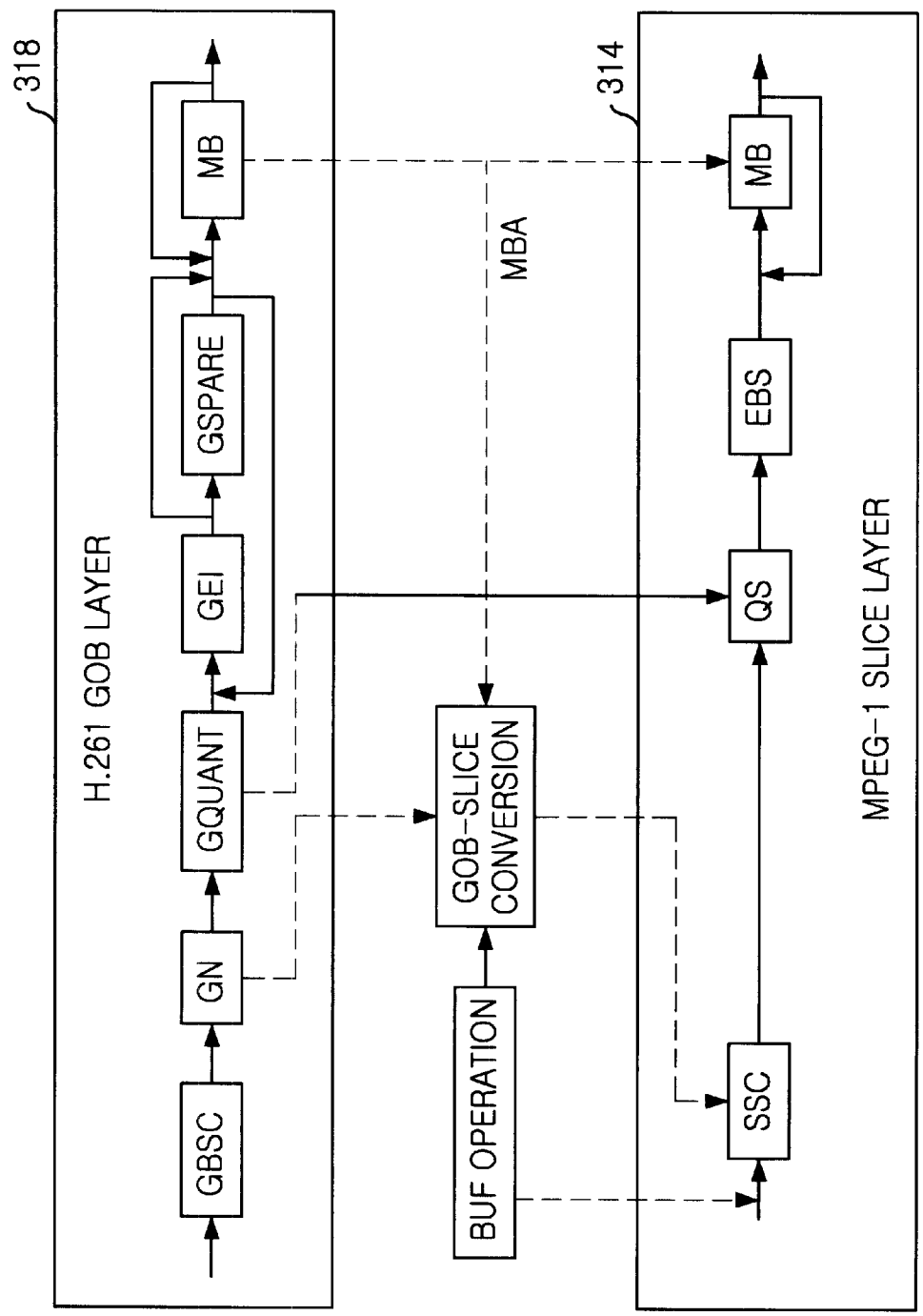
FIG. 4 is an explanatory diagram illustrative of converting an H.261 group of blocks (GOB) layer to an MPEG-1 slice layer shown in FIG. 3.

Referring to FIGS. 3 and 4, the sequence and GOP layer generator 301 generates the MPEG-1 sequence and GOP layers 311 and 312 so that resolution setting and quantization matrix reconstruction are accomplished by using headers of the MPEG-1 sequence and GOP layers 311 and 312. As shown, the H.261 GOB layer 318 includes group of block start code (GBSC), group number (GN), quantizer information (GQUANT), group spare information (GAPARE) and macroblock (MB). Also, the MPEG-1 slice layer 314 includes slice start code (SSC), quantizer step (QS), extended block sequence (EBS) and macroblock (MB).

Quantization matrixes, which exist in the MPEG-1 sequence layer 311, include an intra quantization matrix and a non-intra quantization matrix. The header of the MPEG-1 sequence layer 311 has two normal values in terms of the intra and non-intra quantization matrixes.

The layer-matching element 302 determines a picture type in order of picture. The determined picture type is applied to the header of the MPEG-1 picture layer 313. The layer-matching element 302 performs I and P picture decision with respect to the MPEG-1 compressed moving picture data 3b, start code detection, full-pixel/half-pixel selection and f-code range setting. An f-code range may be extended on the basis of the half-pixel setting so that a motion vector of the H.261 compressed moving picture data 3a is accommodated.

The layer-matching element 303 analyzes a GOB start code (GBSC) and GOB layer spare information (GSPARE) within the header of the H.261 GOB layer 318, thereby generating the header of the MPEG-1 slice layer 314.

The layer-matching element 303 reads 12 GOBs from the GOB start code (GBSC) to the GOB layer spare information (GSPARE) and then checks a macroblock address (MBA). After the macroblock address (MBA) is checked, motion vector and intra direct current (DC) coefficients are reset. To generate the MPEG-1 slice layer 314, one GOB of the H.261 compressed moving picture data is divided into 11 macroblocks. A slice header is attached to the 11 macroblocks.

Figure 5:
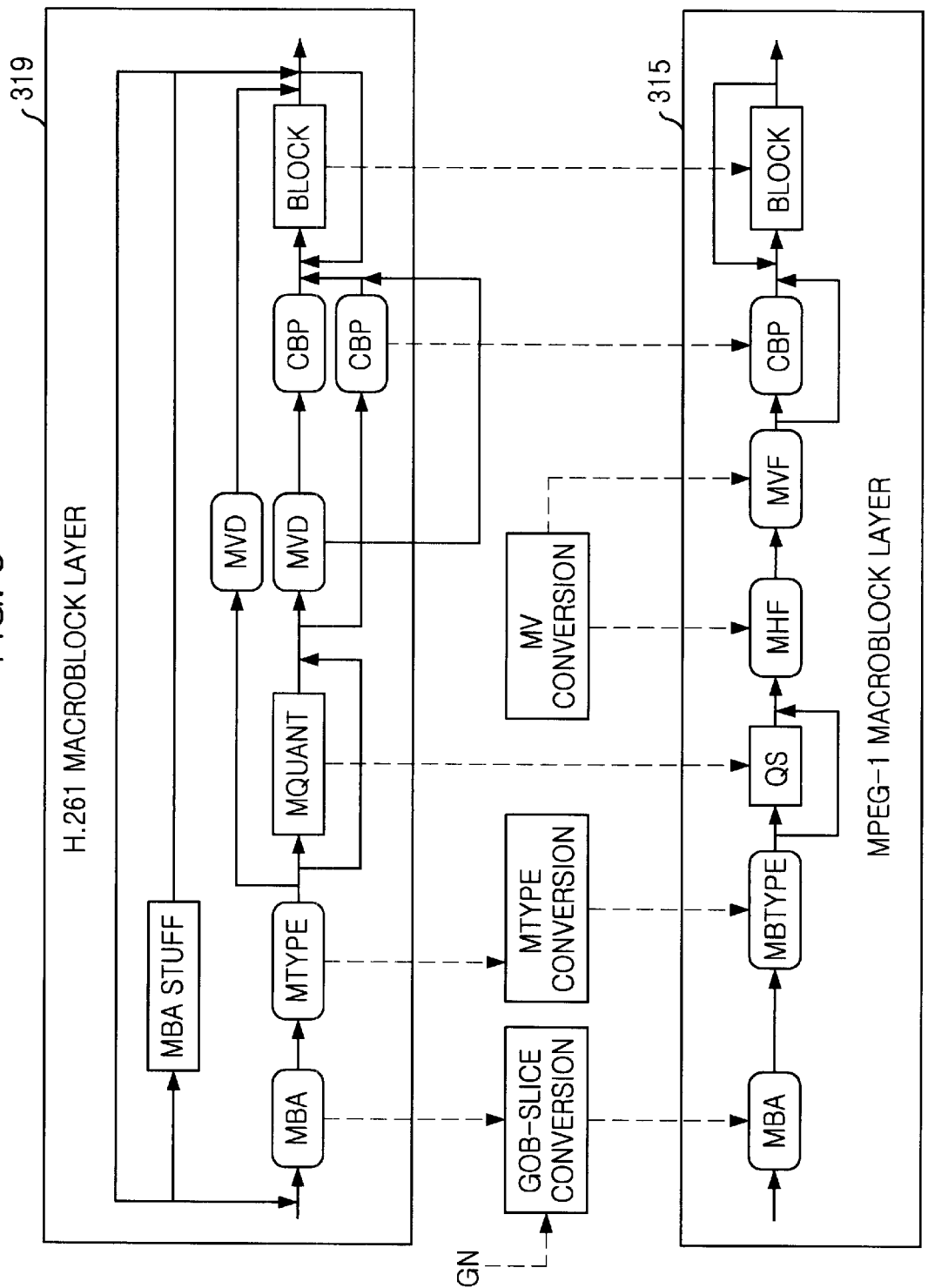
FIG. 5 is an explanatory diagram illustrative of converting an H.261 macroblock layer to an MPEG-1 macroblock layer shown in FIG. 3.

Referring to FIG. 5, the H.261 macroblock layer 319 includes macroblock address (MB), macroblock type (MTYPE), macroblock quantizer (MQUANT), motion vector data (MVD) and coded block pattern (CBP). Also, the MPEG-1 macroblock layer 315 includes macroblock address (MBA), quantizer step (QS), motion vector horizontal flag (MHF), motion vector vertical flag (MVF) and coded block pattern (CBP).

The layer-matching element 304 shown in FIG. 3 addresses a position of a macroblock by changing a first macroblock address increment (MBAI) value of a slice corresponding to an even GOB so as to change a macroblock address (MBA). Since remaining MBAI values correspond to differential values of previous macroblock addresses, the remaining MBAI values are not changed.

When a type of the macroblock of the H.261 compressed moving data is not intra, a differential value of an intra direct current (DC) is reset to "128". When a value corresponding to the type of the macroblock of the H.261 compressed moving picture data is "1", "3", "6" or "9", a quantization value of the H.261 compressed moving picture data is changed to a quantization value of the MPEG-1 compressed moving picture data. Motion vector of the MPEG-1 compressed moving picture data is converted by analyzing horizontal and vertical vectors of the H.261 compressed moving picture data. The MPEG-1 motion vector is generated in the half-pixel unit. The MPEG-1 motion vector depends on the f-code range of the picture layer.

When a value corresponding to the type of the macroblock of the H.261 compressed moving picture data is not "4" or "7", a CBP (coded block pattern) value of the macroblock is checked. The number of luminance and chrominance blocks of the CBP is calculated.

Figure 6:
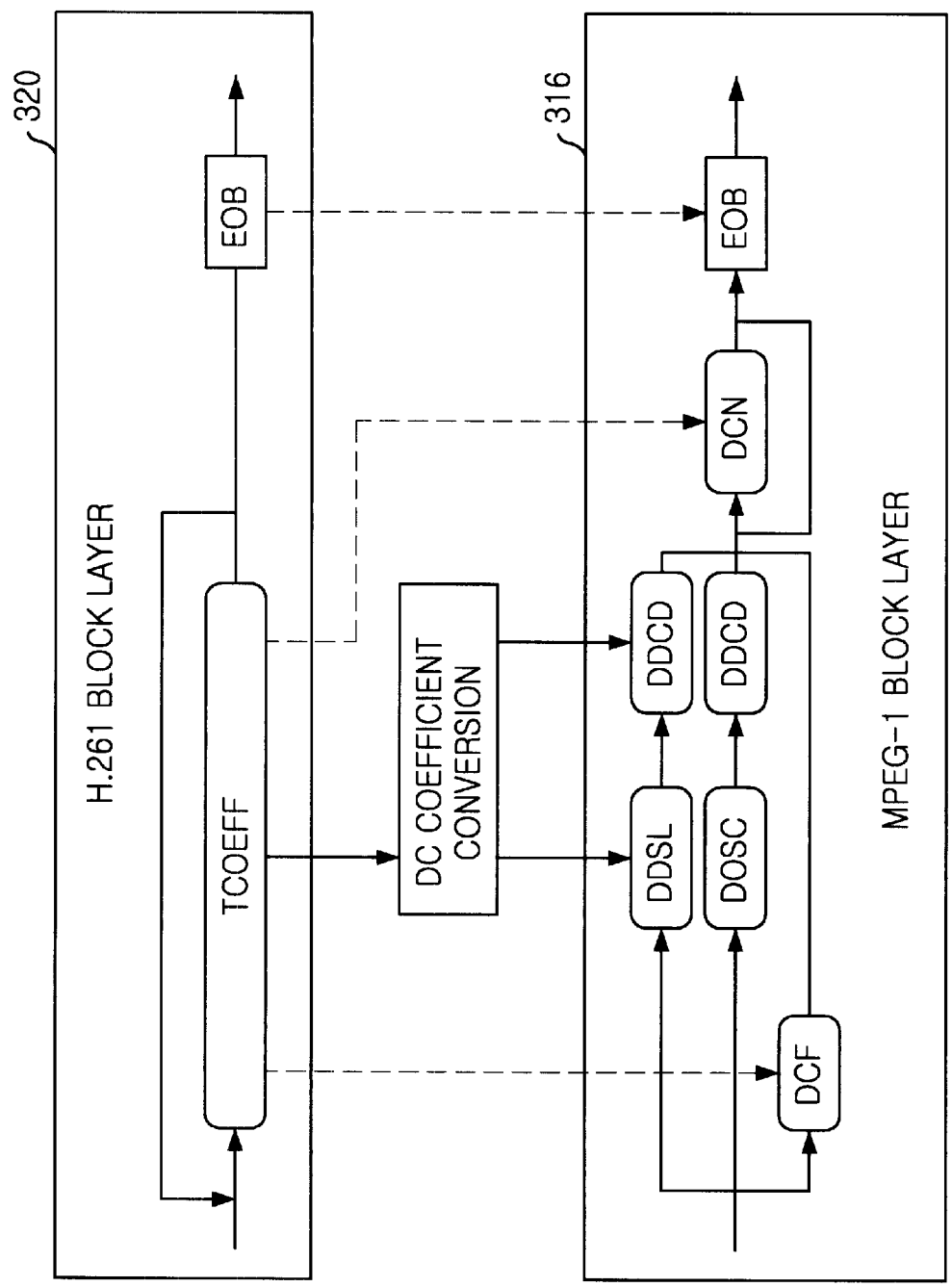
FIG. 6 is an explanatory diagram illustrative of converting an H.261 block layer to an MPEG-1 block layer shown in FIG. 3.

Referring to FIG. 6, the H.261 block layer 320 includes transform coefficients (TCOEFF) and end of block (EOB).

Also, the MPEG-1 block layer 316 includes DCT code flag (DCF), DCT sequence luminance (DDSL), DCT sequence chrominance (DDSC), DCT code data (DDCD) and DCT code number (DCN).

The layer-matching element 305 shown in FIG. 3 converts an intra direct current (DC) coefficient of the H.261 compressed moving picture data to an intra DC coefficient of the MPEG-1 compressed moving picture data. Also, the layer-matching element 305 converts non-intra DC and alternating current (AC) coefficients. The intra DC coefficient of a fixed-length code (FLC) of the H.261 compressed moving picture data is converted to the intra DC coefficient of a variable-length code (VLC) of the MPEG-1 compressed moving picture data. The non-intra DC and AC coefficients are generated as successive differential values on the basis of the intra DC coefficient of the variable-length code (VLC).

Referring to FIG. 8, at step 801, the variable length decoder shown in FIG. 2 generates variable length decoded data as an H.261 compressed moving picture data from an H.261 data bit stream.

At step 802, the compressed moving picture data analyzer shown in FIG. 2 analyzes layer types of the H.261 compressed moving picture data.

At step 803, the sequence and GOP layer generator 301 shown in FIG. 3 generates a header of an MPEG-1 sequence layer and the MPEG-1 sequence layer.

At step 804, the sequence and GOP layer generator 301 shown in FIG. 3 generates a header of an MPEG-1 GOP layer and the MEGP-1 GOP layer.

At step 805, the layer-matching element 302 shown in FIG. 3 determines a picture resolution and a picture type with respect to an MPEG-1 compressed moving picture data. Then, intra and inter pictures of the H.261 compressed moving picture data are converted to I and P pictures of the MPEG-1 compressed moving picture data, respectively.

At step 806, the layer-matching element 302 shown in FIG. 3 analyzes an H.261 picture layer with respect to remaining pictures and then converts an H.261 picture layer to an MPEG-1 picture layer.

At step 807, the layer-matching element 303 shown in FIG. 3 analyzes an H.261 GOB layer and then converts the H.261 GOB layer to an MPEG-1 slice layer.

At step 808, the layer-matching element 304 shown in FIG. 3 analyzes a type of a macroblock of the H.261 compressed moving picture data and then converts an H.261 macroblock layer to an MPEG-1 macroblock layer according to the type of the macroblock of the H.261 compressed moving picture data.

At step 809, the layer-matching element 305 shown in FIG. 3 analyzes an H.261 block layer and then converts the H.261 block layer to an MPEG-1 block layer.

At step 810, it is determined whether the MPEG-1 compressed moving picture data is complete.

At step 811, when the MPEG-1 compressed moving picture data is complete, the variable length encoder 24 shown in FIG. 2 generates variable length coded data as an MPEG-1 data bit stream.

The method for converting the H.261 data bit stream to the MPEG-1 data bit stream in accordance with the present invention can be stored in a computer-readable medium, e.g. an optical disk, hard disk and so on.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A system for converting a heterogeneous compressed moving picture data, comprising:
   a variable length decoder for generating variable length decoded data as first compressed moving picture data from a first data bit stream;
   a compressed moving picture data analyzer for analyzing layer types of the first compressed moving picture data;
   a layer-matching device for matching layers of the first compressed moving picture data to layers of second compressed moving picture data, thereby generating the second compressed moving picture data; and
   a variable length encoder for generating variable length coded data as a second data bit stream.

2. The system as recited in claim 1, wherein the first data bit stream includes an H.261 data bit stream.

3. The system as recited in claim 2, wherein the second data bit stream includes a moving picture expert group-1 (MPEG-1) data bit stream.

4. The system as recited in claim 3, wherein the first compressed moving picture data includes H.261 compressed moving picture data.

5. The system as recited in claim 4, wherein the second compressed moving picture data includes MPEG-1 compressed moving picture data.

6. The system as recited in claim 5, wherein said layer-matching device, including:
   a sequence layer generator for generating an MPEG-1 sequence layer;
   a group of pictures (GOP) layer generator for generating an MPEG-1 GOP layer;
   a first layer-matching element for determining a picture resolution and a picture type of the MEGP-1 compressed moving picture data; converting intra and inter pictures of the H.261 compressed moving picture data to I and P pictures of the MPEG-1 compressed moving picture data; analyzing an H.261 picture layer with respect to remaining pictures; and converting the H.261 picture layer to an MPEG-1 picture layer;
   a second layer-matching element for analyzing an H.261 group of blocks (GOB) layer; reading GOBs from a GOB start code to GOB layer spare information; checking a macroblock address; resetting motion vector and intra direct current coefficients; and converting the H.261 GOB layer to an MPEG-1 slice layer;
   a third layer-matching element for analyzing a type of a macroblock of the H.261 compressed moving picture data; and converting an H.261 macroblock layer to an MPEG-1 macroblock layer according to the type of the macroblock of the H.261 compressed moving picture data; and
   a fourth layer-matching element for analyzing an H.261 block layer; converting an intra DC coefficient of a fixed-length code of the H.261 compressed moving picture data to an intra DC coefficient of a variable-length code of the MPEG-1 compressed moving picture data; and converting the H.261 block layer to an MPEG-1 block layer.

7. A method for converting a heterogeneous compressed moving picture, comprising the steps of:
   a) generating variable length decoded data as first compressed moving picture data from a first data bit stream;
   b) analyzing layer types of the first compressed moving picture data;

c) matching layers of the first compressed moving picture data to layers of second compressed moving picture data, thereby generating the second compressed moving picture data; and d) generating variable length coded data as a second data bit stream.

8. The method as recited in claim 7, wherein the first data bit stream includes an H.261 data bit stream.

9. The method as recited in claim 8, wherein the second data bit stream includes a moving picture expert group-1 (MPEG-1) data bit stream.

10. The method as recited in claim 9, wherein the first compressed moving picture data includes H.261 compressed moving picture data.

11. The method as recited in claim 10, wherein the second compressed moving picture data includes MPEG-1 compressed moving picture data.

12. The method as recited in claim 11, wherein said step c) includes the steps of:

e) generating an MPEG-1 sequence layer;

f) generating an MPEG-1 group of pictures (GOP) layer;

g) converting an H.261 picture layer to an MPEG-1 picture layer;

h) converting an H.261 group of blocks (GOB) layer to an MPEG-1 slice layer;

i) analyzing a type of a macroblock of the H.261 compressed moving picture data; and converting an H.261 macroblock layer to an MPEG-1 macroblock layer according to the type of the macroblock of the H.261 compressed moving picture data; and j) converting an H.261 block layer to an MPEG-1 block layer.

13. The method as recited in claim 12, wherein said step g) includes the steps of:

g1) determining a picture resolution and a picture type of the MPEG-1 compressed moving picture data;

g2) converting intra and inter pictures of the H.261 compressed moving picture data to I and P pictures of the MPEG-1 compressed moving picture data;

g3) analyzing the H.261 picture layer with respect to remaining pictures; and g4) converting the H.261 picture layer to the MPEG-1 picture layer.

14. The method as recited in claim 13, wherein said step h) includes the steps of:

h1) analyzing the H.261 GOB layer;

h2) reading GOBs from a GOB start code to GOB layer spare information;

h3) checking a macroblock address;

h4) resetting motion vector and intra direct current coefficients; and h5) converting the H.261 GOB layer to the MPEG-1 slice layer.

15. The method as recited in claim 14, wherein said step j) includes the steps of:

j1) analyzing the H.261 block layer;

j2) converting an intra DC coefficient of a fixed-length code of the H.261 compressed moving picture data to an intra DC coefficient of a variable-length code of the MPEG-1 compressed moving picture data; and j3) converting the H.261 block layer to the MPEG-1 block layer.

16. A computer-readable medium for performing the steps of:

a) generating variable length decoded data as first compressed moving picture data from a first data bit stream;

b) analyzing layer types of the first compressed moving picture data;

c) matching layers of the first compressed moving picture data to layers of second compressed moving picture data, thereby generating the second compressed moving picture data; and d) generating variable length coded data as a second data bit stream.

17. The computer-readable medium as recited in claim 16, wherein the first data bit stream includes an H.261 data bit stream.

18. The computer-readable medium as recited in claim 17, wherein the second data bit stream includes a moving picture expert group-1 (MPEG-1) data bit stream.

19. The computer-readable medium as recited in claim 18, wherein the first compressed moving picture data includes H.261 compressed moving picture data.

20. The computer-readable medium as recited in claim 19, wherein the second compressed moving picture data includes MPEG-1 compressed moving picture data.

21. The computer-readable medium as recited in claim 20, wherein said step c) includes the steps of:

e) generating an MPEG-1 sequence layer;

f) generating an MPEG-1 group of pictures (GOP) layer;

g) converting an H.261 picture layer to an MPEG-1 picture layer;

h) converting an H.261 group of blocks (GOB) layer to an MPEG-1 slice layer;

i) analyzing a type of a macroblock of the H.261 compressed moving picture data; and converting an H.261 macroblock layer to an MPEG-1 macroblock layer according to the type of the macroblock of the H.261 compressed moving picture data; and j) converting an H.261 block layer to an MPEG-1 block layer.

22. The computer-readable medium as recited in claim 21, wherein said step g) includes the steps of:

g1) determining a picture resolution and a picture type of the MPEG-1 compressed moving picture data;

g2) converting intra and inter pictures of the H.261 compressed moving picture data to I and P pictures of the MPEG-1 compressed moving picture data;

g3) analyzing the H.261 picture layer with respect to remaining pictures; and g4) converting the H.261 picture layer to the MPEG-1 picture layer.

23. The computer-readable medium as recited in claim 22, wherein said step h) includes the steps of:
   h1) analyzing the H.261 GOB layer;
   h2) reading GOBs from a GOB start code to GOB layer spare information;
   h3) checking a macroblock address;
   h4) resetting motion vector and intra direct current coefficients; and
   h5) converting the H.261 GOB layer to the MPEG-1 slice layer.

24. The computer-readable medium as recited in claim 23, wherein said step j) includes the steps of:
   j1) analyzing the H.261 block layer;
   j2) converting an intra DC coefficient of a fixed-length code of the H.261 compressed moving picture data to an intra DC coefficient of a variable-length code of the MPEG-1 compressed moving picture data; and
   j3) converting the H.261 block layer to the MPEG-1 block layer.

* * * * *